US011849415B2

(12) United States Patent
Palacios Umana et al.

(10) Patent No.: US 11,849,415 B2
(45) Date of Patent: Dec. 19, 2023

(54) TIME SYNCHRONISATION

(71) Applicant: McLaren Applied Technologies Limited, Horsell Woking (GB)

(72) Inventors: Pedro Luciano Palacios Umana, Woking (GB); Marco Cattani, Cambridge (GB)

(*) Notice: Subject to any disclaimer, the term of this patent is extended or adjusted under 35 U.S.C. 154(b) by 129 days.

(21) Appl. No.: 17/263,815

(22) PCT Filed: Jul. 25, 2019

(86) PCT No.: PCT/GB2019/052088
§ 371 (c)(1),
(2) Date: Jan. 27, 2021

(87) PCT Pub. No.: WO2020/021271
PCT Pub. Date: Jan. 30, 2020

(65) Prior Publication Data
US 2021/0297975 A1    Sep. 23, 2021

(30) Foreign Application Priority Data
Jul. 27, 2018  (GB) ........................ 1812305

(51) Int. Cl.
*H04W 56/00*     (2009.01)
*H04W 4/38*      (2018.01)
*H04W 52/02*     (2009.01)

(52) U.S. Cl.
CPC ......... *H04W 56/0015* (2013.01); *H04W 4/38* (2018.02); *H04W 52/028* (2013.01); *H04W 52/0229* (2013.01); *H04W 56/0065* (2013.01)

(58) Field of Classification Search
None
See application file for complete search history.

(56) References Cited

U.S. PATENT DOCUMENTS 2,012,755 A    8/1935   Muth
2,371,978 A    3/1945   Perham
(Continued)

FOREIGN PATENT DOCUMENTS

AU    201616964 S    1/2017
AU    201616965 S    1/2017
(Continued)

OTHER PUBLICATIONS

International Search Report and Written Opinion in corresponding Application No. PCT/GB2019/052088, dated Oct. 16, 2019, (13 pages).
(Continued)

*Primary Examiner* — Jutai Kao
(74) *Attorney, Agent, or Firm* — Howard & Howard Attorneys PLLC

(57) ABSTRACT

A device comprising: a wireless communication interface, the communication interface being capable of using an external signal processing device to support a transmission or reception communication event and being configured to provide a first output signal from the communication interface for disabling such a signal processing device after the communication event; a clock external to the communication interface; and a synchronisation circuit configured to receive the first output signal and to synchronise the clock in dependence on the timing of the first output signal.

10 Claims, 2 Drawing Sheets

(56) References Cited

U.S. PATENT DOCUMENTS

| | | |
|---|---|---|
| 2,747,248 A | 5/1956 | Mercer |
| 3,118,201 A | 1/1964 | Beghetto, Jr. |
| 3,487,836 A | 1/1970 | Benjamin et al. |
| 3,516,409 A | 6/1970 | Robert |
| 3,863,640 A | 2/1975 | Haverstock |
| 3,926,193 A | 12/1975 | Hasson |
| 3,933,158 A | 1/1976 | Haverstock |
| 3,971,384 A | 7/1976 | Hasson |
| 3,972,328 A | 8/1976 | Chen |
| 3,983,878 A | 10/1976 | Kawchitch |
| 4,038,989 A | 8/1977 | Romero-Sierra et al. |
| 4,114,624 A | 9/1978 | Haverstock |
| 4,210,148 A | 7/1980 | Stivala |
| 4,222,383 A | 9/1980 | Schossow |
| 4,224,945 A | 9/1980 | Cohen |
| 4,526,173 A | 7/1985 | Sheehan |
| 4,531,521 A | 7/1985 | Haverstock |
| 4,535,772 A | 8/1985 | Sheehan |
| 4,605,005 A | 8/1986 | Sheehan |
| 4,612,230 A | 9/1986 | Liland et al. |
| 4,676,245 A | 6/1987 | Fukuda |
| 4,780,168 A | 10/1988 | Beisang et al. |
| 4,871,367 A | 10/1989 | Christensen et al. |
| 4,881,546 A | 11/1989 | Kaessmann |
| 4,950,282 A | 8/1990 | Beisang et al. |
| 4,966,605 A | 10/1990 | Thieler |
| 4,976,726 A | 12/1990 | Haverstock |
| 5,176,703 A | 1/1993 | Peterson |
| 5,190,032 A | 3/1993 | Zacoi |
| 5,259,835 A | 11/1993 | Clark et al. |
| 5,306,236 A | 4/1994 | Blumenfeld et al. |
| 5,336,219 A | 8/1994 | Krantz |
| 5,377,695 A | 1/1995 | An Haack |
| 5,485,402 A | 1/1996 | Smith et al. |
| 5,486,196 A | 1/1996 | Hirshowitz et al. |
| 5,514,155 A | 5/1996 | Daneshvar |
| 5,524,637 A | 6/1996 | Erickson |
| 5,533,519 A | 7/1996 | Radke et al. |
| 5,562,705 A | 10/1996 | Whiteford |
| 5,643,187 A | 7/1997 | Næstoft et al. |
| 5,645,077 A | 7/1997 | Foxlin |
| 5,665,108 A | 9/1997 | Galindo |
| 5,725,507 A | 3/1998 | Petrick |
| 5,788,660 A | 8/1998 | Resnik |
| 5,823,983 A | 10/1998 | Rosofsky et al. |
| 5,843,123 A | 12/1998 | Brazeau |
| 5,880,976 A | 3/1999 | DiGioia, III et al. |
| 5,935,171 A | 8/1999 | Schneider et al. |
| 6,007,564 A | 12/1999 | Haverstock |
| 6,024,746 A | 2/2000 | Katz |
| 6,031,454 A | 2/2000 | Lovejoy et al. |
| 6,033,654 A | 3/2000 | Stedronsky et al. |
| 6,059,576 A | 5/2000 | Brann |
| 6,074,965 A | 6/2000 | Bodenschatz et al. |
| 6,126,615 A | 10/2000 | Allen et al. |
| 6,168,569 B1 | 1/2001 | McEwen et al. |
| 6,176,868 B1 | 1/2001 | Detour |
| 6,194,629 B1 | 2/2001 | Bernhard |
| 6,447,448 B1 | 9/2002 | Ishikawa et al. |
| 6,463,310 B1 | 10/2002 | Swedlow et al. |
| 6,483,929 B1 | 11/2002 | Murakami et al. |
| 6,540,707 B1 | 4/2003 | Stark et al. |
| 6,611,783 B2 | 8/2003 | Kelly, Jr. et al. |
| 6,629,949 B1 | 10/2003 | Douglas |
| 6,689,100 B2 | 2/2004 | Connelly et al. |
| 6,726,706 B2 | 4/2004 | Dominguez |
| 6,885,737 B1 | 4/2005 | Gao et al. |
| 6,960,193 B2 | 11/2005 | Rosenberg |
| 7,066,182 B1 | 6/2006 | Dunshee |
| 7,109,859 B2 | 9/2006 | Peeters |
| 7,148,803 B2 | 12/2006 | Bandy et al. |
| 7,152,608 B2 | 12/2006 | Hunter et al. |
| 7,233,872 B2 | 6/2007 | Shibasaki et al. |
| 7,245,254 B1 | 7/2007 | Vogt |
| 7,275,218 B2 | 9/2007 | Petrella et al. |
| 7,328,131 B2 | 2/2008 | Donofrio et al. |
| 7,359,816 B2 | 4/2008 | Kumar et al. |
| 7,361,185 B2 | 4/2008 | O'Malley et al. |
| 7,455,681 B2 | 11/2008 | Wilke et al. |
| 7,460,975 B2 | 12/2008 | David |
| 7,461,972 B2 | 12/2008 | Cohen |
| 7,492,254 B2 | 2/2009 | Bandy et al. |
| 7,511,185 B2 | 3/2009 | Lebner |
| 7,518,504 B2 | 4/2009 | Peeters |
| 7,526,398 B1 | 4/2009 | Choi et al. |
| 7,546,090 B2 | 6/2009 | Sayers |
| 7,641,682 B2 | 1/2010 | Palmaz et al. |
| 7,645,285 B2 | 1/2010 | Cosgrove et al. |
| 7,661,200 B2 | 2/2010 | Bonnet et al. |
| 7,698,830 B2 | 4/2010 | Townsend et al. |
| 7,699,793 B2 | 4/2010 | Gotte et al. |
| 7,725,279 B2 | 5/2010 | Luinge et al. |
| 7,742,995 B2 | 6/2010 | Phillips |
| 7,799,042 B2 | 9/2010 | Williamson, IV et al. |
| 7,877,131 B2 | 1/2011 | Jansen et al. |
| 7,881,761 B2 | 2/2011 | Mannheimer et al. |
| 7,945,461 B2 | 5/2011 | Sekura |
| 7,949,386 B2 | 5/2011 | Buly et al. |
| 7,969,307 B2 | 6/2011 | Peeters |
| 7,981,136 B2 | 7/2011 | Weiser |
| 8,048,007 B2 | 11/2011 | Roy |
| 8,050,313 B2 | 11/2011 | Constantinidis et al. |
| 8,075,449 B2 | 12/2011 | Lee |
| 8,077,042 B2 | 12/2011 | Peeters |
| 8,126,736 B2 | 2/2012 | Anderson et al. |
| 8,165,844 B2 | 4/2012 | Luinge et al. |
| 8,165,901 B2 | 4/2012 | Raymond |
| 8,241,296 B2 | 8/2012 | Wasielewski |
| 8,246,590 B2 | 8/2012 | Hu et al. |
| 8,290,792 B2 | 10/2012 | Sekura |
| 8,323,313 B1 | 12/2012 | Belson et al. |
| 8,342,045 B2 | 1/2013 | Maxwell et al. |
| 8,439,945 B2 | 5/2013 | Belson et al. |
| 8,469,902 B2 | 6/2013 | Dick et al. |
| 8,486,070 B2 | 7/2013 | Morgan et al. |
| 8,509,859 B2 | 8/2013 | Jarosinski et al. |
| 8,588,284 B2 | 11/2013 | Lakkis et al. |
| 8,592,640 B2 | 11/2013 | Zepeda et al. |
| 8,593,286 B2 | 11/2013 | Razoumov et al. |
| 8,663,275 B2 | 3/2014 | O'Malley et al. |
| 8,680,360 B2 | 3/2014 | Greener et al. |
| 8,685,093 B2 | 4/2014 | Anderson et al. |
| 8,731,253 B2 | 5/2014 | Dardenne et al. |
| 8,774,900 B2 | 7/2014 | Buly et al. |
| 8,781,860 B2 | 7/2014 | Escorcia et al. |
| 8,814,754 B2 | 8/2014 | Weast et al. |
| 8,814,877 B2 | 8/2014 | Wasielewski |
| 8,876,830 B2 | 11/2014 | Hodorek et al. |
| 8,888,377 B2 | 11/2014 | Claus et al. |
| 8,988,438 B2 | 3/2015 | Bang et al. |
| 8,989,284 B1 | 3/2015 | Vijayaraghavan et al. |
| 9,008,784 B2 | 4/2015 | Chan et al. |
| 9,031,812 B2 | 5/2015 | Roberts et al. |
| 9,041,538 B2 | 5/2015 | Peeters |
| 9,044,345 B2 | 6/2015 | Warkentine et al. |
| 9,050,086 B2 | 6/2015 | Belson et al. |
| 9,089,328 B2 | 7/2015 | Belson et al. |
| 9,089,760 B2 | 7/2015 | Tropper et al. |
| 9,110,505 B2 | 8/2015 | Mastandrea, Jr. |
| 9,119,569 B2 | 9/2015 | Chen et al. |
| 9,122,670 B2 | 9/2015 | Chabanas et al. |
| 9,158,361 B2 | 10/2015 | Fu et al. |
| 9,179,914 B2 | 11/2015 | Belson et al. |
| 9,220,572 B2 | 12/2015 | Meridew et al. |
| 9,222,801 B2 | 12/2015 | Kim et al. |
| 9,222,810 B1 | 12/2015 | Okandan et al. |
| 9,248,002 B2 | 2/2016 | McCarthy |
| 9,248,049 B2 | 2/2016 | Gurtner et al. |
| 9,265,448 B2 | 2/2016 | Bonnet |
| 9,271,858 B2 | 3/2016 | Ben-Meir et al. |
| 9,295,576 B2 | 3/2016 | Boone et al. |
| 9,311,789 B1 | 4/2016 | Gwin |
| 9,330,239 B2 | 5/2016 | Koduri et al. |
| 9,393,460 B1 | 7/2016 | Emigh |

(56) References Cited

U.S. PATENT DOCUMENTS

| | | |
|---|---|---|
| 9,410,979 B2 | 8/2016 | Yuen et al. |
| 9,420,083 B2 | 8/2016 | Roberts et al. |
| 9,421,448 B2 | 8/2016 | Tropper et al. |
| 9,470,699 B2 | 10/2016 | Peeters |
| 9,474,529 B2 | 10/2016 | Belson et al. |
| 9,532,730 B2 | 1/2017 | Wasielewski |
| 9,554,799 B2 | 1/2017 | Belson et al. |
| 9,554,800 B2 | 1/2017 | Belson et al. |
| 9,561,034 B2 | 2/2017 | Belson et al. |
| 9,585,602 B1 | 3/2017 | Navarro et al. |
| 9,591,997 B2 | 3/2017 | Menzel |
| 9,595,187 B2 | 3/2017 | Kotz et al. |
| 9,600,934 B2 | 3/2017 | Odessky et al. |
| 9,629,583 B2 | 4/2017 | Gradel et al. |
| 9,642,572 B2 | 5/2017 | Mahfouz et al. |
| 9,642,621 B2 | 5/2017 | Belson et al. |
| 9,642,622 B2 | 5/2017 | Belson et al. |
| 9,662,228 B2 | 5/2017 | McCarthy |
| 9,665,686 B2 | 5/2017 | Van Vorhis et al. |
| 9,669,249 B2 | 6/2017 | Marti et al. |
| 9,672,715 B2 | 6/2017 | Roberts et al. |
| 9,693,711 B2 | 7/2017 | Yuen et al. |
| 9,730,617 B2 | 8/2017 | Schlumbohm et al. |
| 9,735,893 B1 | 8/2017 | Aleksov et al. |
| 9,763,581 B2 | 9/2017 | Bonutti et al. |
| 9,786,148 B2 | 10/2017 | Sundaram et al. |
| 9,808,562 B2 | 11/2017 | Wu et al. |
| 9,832,206 B2 | 11/2017 | Mare et al. |
| 9,861,446 B2 | 1/2018 | Lang |
| 9,895,086 B2 | 2/2018 | Van De Laar et al. |
| 9,901,405 B2 | 2/2018 | Valin et al. |
| 9,913,691 B2 | 3/2018 | Brooks |
| 9,916,422 B2 | 3/2018 | Haimerl |
| 9,919,198 B2 | 3/2018 | Romeo et al. |
| 9,924,891 B2 | 3/2018 | Knecht et al. |
| 9,924,921 B1 | 3/2018 | Irish et al. |
| 9,936,877 B2 | 4/2018 | Kotz et al. |
| 9,949,669 B2 | 4/2018 | DiSilvestro et al. |
| 9,949,797 B2 | 4/2018 | Meridew et al. |
| 9,961,547 B1 | 5/2018 | Molina-Markham et al. |
| 9,974,478 B1 | 5/2018 | Brokaw et al. |
| 9,999,378 B2 | 6/2018 | Ronchi et al. |
| 10,004,455 B2 | 6/2018 | Senanayake et al. |
| 10,010,714 B2 | 7/2018 | Coleman et al. |
| 10,013,832 B2 | 7/2018 | Hyde et al. |
| 10,091,748 B2 | 10/2018 | Otomo et al. |
| 10,109,175 B2 | 10/2018 | Roberts et al. |
| 10,123,801 B2 | 11/2018 | Belson et al. |
| 10,126,108 B2 | 11/2018 | Umer et al. |
| 10,135,819 B2 | 11/2018 | Tijerina et al. |
| 10,182,746 B1 | 1/2019 | Demiralp et al. |
| 10,188,322 B2 | 1/2019 | Piijl et al. |
| 10,194,837 B2 | 2/2019 | Kanchan et al. |
| 10,206,627 B2 | 2/2019 | LeBoeuf et al. |
| 10,213,158 B2 | 2/2019 | Fyfe et al. |
| 10,216,904 B2 | 2/2019 | Hughes et al. |
| 10,219,726 B2 | 3/2019 | Wei et al. |
| 10,219,741 B2 | 3/2019 | Stein et al. |
| 10,231,628 B2 | 3/2019 | Guillemaud et al. |
| 10,234,934 B2 | 3/2019 | Connor |
| 10,264,968 B2 | 4/2019 | Gross |
| 10,271,738 B2 | 4/2019 | Peeters |
| 10,271,790 B2 | 4/2019 | Lee |
| 10,314,520 B2 | 6/2019 | Hauenstein et al. |
| 10,321,961 B2 | 6/2019 | McCarthy et al. |
| 10,398,359 B2 | 9/2019 | Dumanyan et al. |
| 10,413,250 B2 | 9/2019 | LeBoeuf et al. |
| 10,415,975 B2 | 9/2019 | Bellusci et al. |
| 10,456,075 B2 | 10/2019 | Auchinleck et al. |
| 10,456,136 B2 | 10/2019 | Belson et al. |
| 10,463,279 B2 | 11/2019 | Chapman et al. |
| 10,531,924 B2 | 1/2020 | Kang et al. |
| 10,561,360 B2 | 2/2020 | Amiot et al. |
| 10,568,550 B2 | 2/2020 | Ronchi et al. |
| 10,575,759 B2 | 3/2020 | Salamatian et al. |
| 10,576,326 B2 | 3/2020 | Vuillerme et al. |
| 10,581,606 B2 | 3/2020 | Liang et al. |
| 10,582,891 B2 | 3/2020 | Wiedenhoefer et al. |
| 10,624,561 B2 | 4/2020 | Foxlin et al. |
| 10,638,970 B2 | 5/2020 | Obma et al. |
| 10,653,339 B2 | 5/2020 | Gaddam et al. |
| 10,702,205 B2 | 7/2020 | Sharman et al. |
| 10,709,377 B2 | 7/2020 | Wiedenhoefer et al. |
| 10,722,145 B2 | 7/2020 | Sundaram et al. |
| 10,796,549 B2 | 10/2020 | Roberts et al. |
| 10,821,047 B2 | 11/2020 | Van Acht et al. |
| 10,828,175 B2 | 11/2020 | Chapman et al. |
| 10,859,597 B2 | 12/2020 | Sheng et al. |
| 10,863,928 B1 | 12/2020 | Mobbs et al. |
| 10,888,269 B2 | 1/2021 | Belson et al. |
| 10,918,332 B2 | 2/2021 | Belson et al. |
| 10,966,788 B2 | 4/2021 | Britton et al. |
| 10,987,029 B1 | 4/2021 | Ikelaar et al. |
| 10,993,639 B2 | 5/2021 | Herr et al. |
| 11,000,229 B2 | 5/2021 | Leavitt et al. |
| 11,045,113 B2 | 6/2021 | Pappe et al. |
| 11,146,604 B2 | 10/2021 | Havekes et al. |
| 11,153,026 B2 | 10/2021 | Pierson et al. |
| 11,179,065 B2 | 11/2021 | Slepian |
| 11,337,649 B2 | 5/2022 | Belson et al. |
| 2002/0099315 A1 | 7/2002 | Lebner |
| 2003/0065294 A1 | 4/2003 | Pickup et al. |
| 2003/0108352 A1 | 6/2003 | Hellman |
| 2003/0120198 A1 | 6/2003 | Barkell et al. |
| 2003/0163160 A1 | 8/2003 | O'Malley et al. |
| 2003/0220596 A1 | 11/2003 | Dunshee |
| 2004/0072964 A1 | 4/2004 | Udding et al. |
| 2004/0106904 A1 | 6/2004 | Gonnelli et al. |
| 2004/0204740 A1 | 10/2004 | Weiser |
| 2004/0210176 A1 | 10/2004 | Diana |
| 2004/0260234 A1 | 12/2004 | Srinivasan et al. |
| 2005/0020957 A1 | 1/2005 | Lebner |
| 2005/0070956 A1 | 3/2005 | Rousseau |
| 2005/0080453 A1 | 4/2005 | Lebner et al. |
| 2005/0085757 A1 | 4/2005 | Santanello |
| 2005/0153090 A1 | 7/2005 | Marchitto et al. |
| 2005/0234332 A1 | 10/2005 | Murphy |
| 2005/0234485 A1 | 10/2005 | Seegert et al. |
| 2005/0277959 A1 | 12/2005 | Cosgrove et al. |
| 2005/0284801 A1 | 12/2005 | Tacklind |
| 2006/0030886 A1 | 2/2006 | Clark |
| 2006/0122522 A1 | 6/2006 | Chavan et al. |
| 2006/0200198 A1 | 9/2006 | Riskin et al. |
| 2006/0259033 A1 | 11/2006 | Nesbitt |
| 2006/0271320 A1 | 11/2006 | Kumar et al. |
| 2006/0277023 A1 | 12/2006 | Maiti et al. |
| 2007/0026078 A1 | 2/2007 | Almarsson et al. |
| 2007/0032748 A1 | 2/2007 | McNeil et al. |
| 2007/0038247 A1 | 2/2007 | Lebner et al. |
| 2007/0078366 A1 | 4/2007 | Haggstrom et al. |
| 2007/0088339 A1 | 4/2007 | Luchetti |
| 2007/0106277 A1 | 5/2007 | Hood et al. |
| 2007/0141130 A1 | 6/2007 | Villanueva et al. |
| 2007/0169364 A1 | 7/2007 | Townsend et al. |
| 2007/0179419 A1 | 8/2007 | Simpson |
| 2007/0179626 A1 | 8/2007 | de la Barrera et al. |
| 2007/0185432 A1 | 8/2007 | Etheredge et al. |
| 2007/0260278 A1 | 11/2007 | Wheeler et al. |
| 2008/0033334 A1 | 2/2008 | Gurtner et al. |
| 2008/0081951 A1 | 4/2008 | Frasier et al. |
| 2008/0103550 A1 | 5/2008 | Wenzel et al. |
| 2008/0114396 A1 | 5/2008 | Cory et al. |
| 2008/0147115 A1 | 6/2008 | O'Malley et al. |
| 2008/0161731 A1 | 7/2008 | Woods et al. |
| 2008/0228219 A1 | 9/2008 | Weiser |
| 2008/0281555 A1 | 11/2008 | Godin et al. |
| 2008/0287864 A1 | 11/2008 | Rosenberg |
| 2009/0023391 A1 | 1/2009 | Falck |
| 2009/0036922 A1 | 2/2009 | Riskin et al. |
| 2009/0062531 A1 | 3/2009 | Kanda |
| 2009/0099496 A1 | 4/2009 | Heegaard et al. |
| 2009/0118649 A1 | 5/2009 | Cabrera et al. |
| 2009/0149869 A1 | 6/2009 | Dolhun |
| 2009/0158131 A1 | 6/2009 | Choi et al. |

(56) References Cited

U.S. PATENT DOCUMENTS

| | | |
|---|---|---|
| 2009/0162531 A1 | 6/2009 | Nesbitt |
| 2009/0177225 A1 | 7/2009 | Nunez et al. |
| 2009/0177227 A1 | 7/2009 | Warren |
| 2009/0204031 A1 | 8/2009 | McNames et al. |
| 2009/0264709 A1 | 10/2009 | Blurton et al. |
| 2009/0299255 A1 | 12/2009 | Kazala, Jr. et al. |
| 2009/0299257 A1 | 12/2009 | Long et al. |
| 2009/0299303 A1 | 12/2009 | Seegert |
| 2010/0010380 A1 | 1/2010 | Panken et al. |
| 2010/0023074 A1 | 1/2010 | Powers et al. |
| 2010/0036209 A1 | 2/2010 | Ferren et al. |
| 2010/0063508 A1 | 3/2010 | Borja et al. |
| 2010/0100011 A1 | 4/2010 | Roche |
| 2010/0100022 A1 | 4/2010 | Greener et al. |
| 2010/0121286 A1 | 5/2010 | Locke et al. |
| 2010/0127879 A1 | 5/2010 | Hotokebuchi et al. |
| 2010/0191088 A1 | 7/2010 | Anderson et al. |
| 2010/0191100 A1 | 7/2010 | Anderson et al. |
| 2010/0228287 A1 | 9/2010 | Jeekel et al. |
| 2011/0003563 A1* | 1/2011 | Gorbachov ............ H04B 1/44 333/101 |
| 2011/0028865 A1 | 2/2011 | Luinge et al. |
| 2011/0077667 A1 | 3/2011 | Singhatat et al. |
| 2011/0106026 A1 | 5/2011 | Wu et al. |
| 2011/0118698 A1 | 5/2011 | Eckhoff et al. |
| 2011/0144470 A1 | 6/2011 | Mazar et al. |
| 2011/0213275 A1 | 9/2011 | Boos et al. |
| 2011/0218458 A1 | 9/2011 | Valin et al. |
| 2011/0270132 A1 | 11/2011 | Mezghani et al. |
| 2011/0313327 A1 | 12/2011 | Van Acht et al. |
| 2012/0029266 A1 | 2/2012 | Holmes et al. |
| 2012/0053594 A1 | 3/2012 | Pelletier et al. |
| 2012/0095502 A1 | 4/2012 | Bargon et al. |
| 2012/0116485 A1 | 5/2012 | Burgmann |
| 2012/0203273 A1 | 8/2012 | Riskin et al. |
| 2012/0221044 A1 | 8/2012 | Archibald et al. |
| 2012/0226214 A1 | 9/2012 | Gurtner et al. |
| 2012/0232587 A1 | 9/2012 | Burke et al. |
| 2012/0278095 A1 | 11/2012 | Homchowdhury et al. |
| 2013/0066365 A1 | 3/2013 | Belson et al. |
| 2013/0072969 A1 | 3/2013 | Zhang |
| 2013/0108352 A1 | 5/2013 | Ruiz, Sr. et al. |
| 2013/0178897 A1 | 7/2013 | Wu et al. |
| 2013/0185310 A1 | 7/2013 | De Guise et al. |
| 2013/0211259 A1 | 8/2013 | Komistek et al. |
| 2013/0217998 A1 | 8/2013 | Mahfouz et al. |
| 2013/0267928 A1 | 10/2013 | Imran et al. |
| 2013/0281885 A1 | 10/2013 | Rowbottom et al. |
| 2013/0281981 A1 | 10/2013 | Shamir Lebovitz |
| 2013/0282049 A1 | 10/2013 | Peterson et al. |
| 2013/0310711 A1 | 11/2013 | Wang et al. |
| 2013/0331757 A1 | 12/2013 | Belson |
| 2014/0074156 A1 | 3/2014 | Belson et al. |
| 2014/0085050 A1 | 3/2014 | Luna |
| 2014/0171849 A1 | 6/2014 | Fischell et al. |
| 2014/0222070 A1 | 8/2014 | Belson et al. |
| 2014/0257141 A1 | 9/2014 | Giuffrida et al. |
| 2014/0277526 A1 | 9/2014 | Stein et al. |
| 2014/0278229 A1 | 9/2014 | Hong et al. |
| 2014/0316323 A1 | 10/2014 | Kanevsky et al. |
| 2015/0022362 A1 | 1/2015 | Lucas et al. |
| 2015/0045700 A1 | 2/2015 | Cavanagh et al. |
| 2015/0105423 A1 | 4/2015 | Haudenschild et al. |
| 2015/0106024 A1 | 4/2015 | Lightcap |
| 2015/0117437 A1* | 4/2015 | Abedini ............ H04W 56/0025 370/350 |
| 2015/0148653 A1 | 5/2015 | Fleig et al. |
| 2015/0209563 A1 | 7/2015 | Amir |
| 2015/0216527 A1 | 8/2015 | Belson et al. |
| 2015/0309535 A1 | 10/2015 | Connor |
| 2015/0313593 A1 | 11/2015 | Patenaude |
| 2015/0327778 A1 | 11/2015 | Bonutti et al. |
| 2015/0332004 A1 | 11/2015 | Najafi et al. |
| 2015/0351690 A1 | 12/2015 | Toth et al. |
| 2015/0379203 A1 | 12/2015 | Douglass |
| 2016/0007909 A1 | 1/2016 | Singh et al. |
| 2016/0015319 A1 | 1/2016 | Billi et al. |
| 2016/0022015 A1 | 1/2016 | Miller et al. |
| 2016/0045317 A1 | 2/2016 | Lang et al. |
| 2016/0073934 A1 | 3/2016 | Ronchi et al. |
| 2016/0095597 A1 | 4/2016 | Belson et al. |
| 2016/0106931 A1 | 4/2016 | Belson et al. |
| 2016/0114146 A1 | 4/2016 | Belson et al. |
| 2016/0157936 A1 | 6/2016 | Netravali |
| 2016/0202755 A1 | 7/2016 | Connor |
| 2016/0206311 A1 | 7/2016 | Belson et al. |
| 2016/0206312 A1 | 7/2016 | Belson et al. |
| 2016/0206313 A1 | 7/2016 | Belson et al. |
| 2016/0206378 A1 | 7/2016 | Flett et al. |
| 2016/0213924 A1 | 7/2016 | Coleman et al. |
| 2016/0220175 A1 | 8/2016 | Tam et al. |
| 2016/0220252 A1 | 8/2016 | Belson et al. |
| 2016/0242646 A1 | 8/2016 | Obma |
| 2016/0249833 A1 | 9/2016 | Ronchi et al. |
| 2016/0249924 A1 | 9/2016 | Belson et al. |
| 2016/0262685 A1 | 9/2016 | Wagner et al. |
| 2016/0278868 A1 | 9/2016 | Berend et al. |
| 2016/0296149 A1 | 10/2016 | Polsky et al. |
| 2016/0302721 A1 | 10/2016 | Wiedenhoefer et al. |
| 2016/0310140 A1 | 10/2016 | Belson et al. |
| 2016/0324447 A1 | 11/2016 | Hallberg |
| 2016/0324461 A1 | 11/2016 | Hallberg |
| 2016/0330707 A1* | 11/2016 | Das ............ H04L 67/535 |
| 2016/0338621 A1 | 11/2016 | Kanchan et al. |
| 2016/0338644 A1 | 11/2016 | Connor |
| 2017/0000386 A1 | 1/2017 | Salamatian et al. |
| 2017/0010667 A1 | 1/2017 | Tanaka et al. |
| 2017/0029611 A1 | 2/2017 | Amano |
| 2017/0042541 A1 | 2/2017 | Belson et al. |
| 2017/0055896 A1 | 3/2017 | Al-Ali et al. |
| 2017/0095693 A1 | 4/2017 | Chang et al. |
| 2017/0099586 A1* | 4/2017 | Corbin ............ H04W 4/08 |
| 2017/0119475 A1 | 5/2017 | McCabe et al. |
| 2017/0128135 A1 | 5/2017 | McCarthy et al. |
| 2017/0143341 A1 | 5/2017 | Belson et al. |
| 2017/0147789 A1 | 5/2017 | Wiedenhoefer et al. |
| 2017/0156664 A1 | 6/2017 | Belson et al. |
| 2017/0188264 A1* | 6/2017 | Hwang ............ H04B 1/1027 |
| 2017/0188875 A1 | 7/2017 | Banet et al. |
| 2017/0196507 A1 | 7/2017 | Singh et al. |
| 2017/0202682 A1 | 7/2017 | McCarthy |
| 2017/0238849 A1 | 8/2017 | Chapman et al. |
| 2017/0245872 A1 | 8/2017 | Rock et al. |
| 2017/0265800 A1 | 9/2017 | Auchinleck et al. |
| 2017/0273601 A1 | 9/2017 | Wang et al. |
| 2017/0281054 A1 | 10/2017 | Stever et al. |
| 2017/0281074 A1 | 10/2017 | D'Lima et al. |
| 2017/0296115 A1 | 10/2017 | Mahfouz et al. |
| 2017/0329933 A1 | 11/2017 | Brust et al. |
| 2017/0337349 A1 | 11/2017 | Cronin |
| 2017/0367644 A1 | 12/2017 | Sharman et al. |
| 2018/0096111 A1 | 4/2018 | Wells et al. |
| 2018/0125365 A1 | 5/2018 | Hunter et al. |
| 2018/0130373 A1 | 5/2018 | Bernard-Paroly et al. |
| 2018/0147016 A1 | 5/2018 | Valin et al. |
| 2018/0160966 A1 | 6/2018 | Inan et al. |
| 2018/0161101 A1 | 6/2018 | Barsoum et al. |
| 2018/0261316 A1 | 9/2018 | Spooner et al. |
| 2018/0275859 A1 | 9/2018 | Hodge |
| 2018/0279919 A1 | 10/2018 | Bansbach et al. |
| 2018/0289313 A1 | 10/2018 | Inan et al. |
| 2018/0315247 A1 | 11/2018 | Van Andel |
| 2018/0317813 A1 | 11/2018 | Hall et al. |
| 2019/0009133 A1 | 1/2019 | Mettler May |
| 2019/0019578 A1 | 1/2019 | Vaccaro |
| 2019/0038187 A1 | 2/2019 | Latella, Jr. |
| 2019/0038225 A1 | 2/2019 | Leavitt et al. |
| 2019/0060128 A1 | 2/2019 | Belson |
| 2019/0103818 A1* | 4/2019 | Walz ............ H02M 7/53875 |
| 2019/0111327 A1 | 4/2019 | Mochizuki |
| 2019/0117121 A1 | 4/2019 | Kutina et al. |
| 2019/0117156 A1 | 4/2019 | Howard et al. |
| 2019/0117312 A1 | 4/2019 | Britton et al. |
| 2019/0133693 A1 | 5/2019 | Mahfouz |

(56) References Cited

U.S. PATENT DOCUMENTS

| | | |
|---|---|---|
| 2019/0148001 A1 | 5/2019 | Hughes et al. |
| 2019/0224528 A1 | 7/2019 | Omid-Zohoor et al. |
| 2019/0282126 A1 | 9/2019 | Kord |
| 2019/0290198 A1 | 9/2019 | Belson et al. |
| 2019/0293404 A1 | 9/2019 | Abad et al. |
| 2019/0298253 A1 | 10/2019 | Hal |
| 2019/0307983 A1 | 10/2019 | Goldman |
| 2019/0350522 A1 | 11/2019 | Bailey et al. |
| 2019/0388025 A1 | 12/2019 | Hunter |
| 2020/0016044 A1 | 1/2020 | Rodrigues et al. |
| 2020/0046263 A1 | 2/2020 | Hauenstein et al. |
| 2020/0046264 A1 | 2/2020 | Chapman et al. |
| 2020/0054275 A1 | 2/2020 | Kim et al. |
| 2020/0061415 A1 | 2/2020 | Tropper et al. |
| 2020/0160044 A1 | 5/2020 | Sur et al. |
| 2020/0215324 A1 | 7/2020 | Mantovani et al. |
| 2020/0221974 A1 | 7/2020 | Singh |
| 2020/0237291 A1 | 7/2020 | Sundaram et al. |
| 2020/0260993 A1 | 8/2020 | Ronchi et al. |
| 2020/0269091 A1 | 8/2020 | Liu et al. |
| 2020/0289889 A1 | 9/2020 | Hacking et al. |
| 2020/0335222 A1 | 10/2020 | Winterbach et al. |
| 2020/0337629 A1 | 10/2020 | Wiedenhoefer et al. |
| 2020/0346072 A1 | 11/2020 | Shah |
| 2020/0349859 A1 | 11/2020 | Shah |
| 2020/0405195 A1 | 12/2020 | Liu et al. |
| 2021/0045641 A1 | 2/2021 | Al-Ali et al. |
| 2021/0050098 A1 | 2/2021 | Sterner et al. |
| 2021/0059564 A2 | 3/2021 | Kutina et al. |
| 2021/0076981 A1 | 3/2021 | Hacking et al. |
| 2021/0090419 A1 | 3/2021 | Roberts et al. |
| 2021/0113150 A1 | 4/2021 | Belson et al. |
| 2021/0161613 A1 | 6/2021 | Poltaretskyi et al. |
| 2021/0162262 A1 | 6/2021 | Lee |
| 2021/0227689 A1 | 7/2021 | Kimoto |
| 2021/0251574 A1 | 8/2021 | Halter et al. |
| 2021/0290398 A1 | 9/2021 | Roche |
| 2021/0375423 A1 | 12/2021 | Levy |
| 2021/0386292 A1 | 12/2021 | Hunter et al. |
| 2022/0006557 A1 | 1/2022 | Pierson et al. |
| 2022/0008225 A1 | 1/2022 | Gross et al. |
| 2022/0051767 A1 | 2/2022 | Tikka |

FOREIGN PATENT DOCUMENTS

| | | |
|---|---|---|
| AU | 201616966 S | 1/2017 |
| AU | 2014253670 B2 | 11/2019 |
| CN | 1126430 A | 7/1996 |
| CN | 1442119 A | 9/2003 |
| CN | 1524507 A | 9/2004 |
| CN | 101938944 A | 1/2011 |
| CN | 202537562 U | 11/2012 |
| CN | 102946812 A | 2/2013 |
| CN | 104755033 A | 7/2015 |
| CN | 104825200 A | 8/2015 |
| CN | 109163721 A | 1/2019 |
| DE | 102015100795 A1 | 7/2016 |
| EP | 1600108 A2 | 11/2005 |
| EP | 2057944 A1 | 5/2009 |
| EP | 1483924 A1 | 12/2011 |
| EP | 2768119 A2 | 8/2014 |
| EP | 2819466 A1 | 12/2014 |
| EP | 3139835 B1 | 10/2020 |
| GB | 1401877 A | 8/1975 |
| GB | 2536178 A | 9/2016 |
| GB | 2574075 B | 7/2020 |
| JP | S62243557 A | 10/1987 |
| JP | H07502913 A | 3/1995 |
| JP | 2001149485 A | 6/2001 |
| JP | 2005512678 A | 5/2005 |
| JP | 2005532134 A | 10/2005 |
| JP | 2010504835 A | 2/2010 |
| JP | 2013515417 A | 5/2013 |
| JP | 2013538603 A | 10/2013 |
| JP | 2018057527 A | 4/2018 |
| WO | 8401805 A1 | 5/1984 |
| WO | 9629013 A1 | 9/1996 |
| WO | 2000038571 A1 | 7/2000 |
| WO | 0110508 A1 | 2/2001 |
| WO | 03053296 A1 | 7/2003 |
| WO | 2004006660 A1 | 1/2004 |
| WO | 2004006782 A1 | 1/2004 |
| WO | 2006099535 A1 | 9/2006 |
| WO | 2006124671 A2 | 11/2006 |
| WO | 2007004603 A1 | 1/2007 |
| WO | 2007044647 A2 | 4/2007 |
| WO | 2008019051 A2 | 2/2008 |
| WO | 2008044679 A1 | 4/2008 |
| WO | 2008060532 A2 | 5/2008 |
| WO | 2009066116 A1 | 5/2009 |
| WO | 2010082157 A1 | 7/2010 |
| WO | 2011043786 A1 | 4/2011 |
| WO | 2011139912 A1 | 11/2011 |
| WO | 2011159623 A1 | 12/2011 |
| WO | 2012061438 A2 | 5/2012 |
| WO | 2012061440 A2 | 5/2012 |
| WO | 2013067024 A1 | 5/2013 |
| WO | 2013095716 A1 | 6/2013 |
| WO | 2014066879 A2 | 5/2014 |
| WO | 2014070922 A1 | 5/2014 |
| WO | 2015012887 A1 | 1/2015 |
| WO | 2015103556 A1 | 7/2015 |
| WO | 2015168165 A1 | 11/2015 |
| WO | 2016180438 A1 | 11/2016 |
| WO | 2016180439 A1 | 11/2016 |
| WO | 2017027075 A1 | 2/2017 |
| WO | 2017044120 A1 | 3/2017 |
| WO | 2017088068 A1 | 6/2017 |
| WO | 2017181059 A1 | 10/2017 |
| WO | 2017184825 A1 | 10/2017 |
| WO | 2018081795 A1 | 5/2018 |
| WO | 2018092944 A1 | 5/2018 |
| WO | 2019051564 A1 | 3/2019 |
| WO | 2019068194 A1 | 4/2019 |
| WO | 2019112158 A1 | 6/2019 |
| WO | 2019175899 A1 | 9/2019 |
| WO | 2019224279 A1 | 11/2019 |
| WO | 2019238927 A1 | 12/2019 |
| WO | 202004660 A1 | 1/2020 |
| WO | 2020021271 A1 | 1/2020 |
| WO | 2020046660 A1 | 3/2020 |
| WO | 2020127246 A1 | 6/2020 |
| WO | 2020180916 A1 | 9/2020 |
| WO | 2021048022 A1 | 3/2021 |
| WO | 2021074851 A1 | 4/2021 |
| WO | 2021074852 A1 | 4/2021 |
| WO | 2021074853 A1 | 4/2021 |
| WO | 2021074855 A1 | 4/2021 |
| WO | 2021154885 A2 | 8/2021 |

OTHER PUBLICATIONS

GB Search Report in corresponding Application No. 1812305.9, dated Jan. 28, 2019, (4 pages).

Esposito, Ph.D, Christina I. et al., "Does Degenerative Lumbar Spine Disease Influence Femoroacetabular Flexion in Patients Undergoing Total Hip Arthroplasy?", Ciin. Orthop. Relat. Res., vol. 474, 2016, pp. 1788-1797.

Fischer, Maximilian C.M. et al., "Relationship Between Pelvic Morphology and Functional Parameters in Standing Position for Patient Specific Cup Planning in THA", CAOS, 17th Annual Meeting of the International Society for Computer Assisted Orthopaedic Surgery, 2017, pp. 88-92.

Gibbs, Peter et al., "Wearable Conductive Fiber Sensors for Multi-Axis Human Joint Angle Measurements", Journal or Neuroengineering and Rehabilitation, vol. 2, No. 1, Mar. 2, 2005, 18 pages.

Goujon-Pillet, Helene et al., Three-Dimensional Motiions of Trunk and Pelvis During Transfemoral Amputee Gait, Arch. Phys. Med. Rehabil., vol. 89, 2008, pp. 87-94.

Gupta, Rajeev et al., "Posture Recognition for Safe Driving", Third International Conference on Information Processing (ICIIP), 2015, pp. 141-146.

(56) References Cited

OTHER PUBLICATIONS

Hinge Health, "Digital MSK Clinic Webpage", https://www.hingehealth.com/, 2021, 9 pages.
Imai, Norio et al., "Pelvic Flexion Measurement From Lateral Projectioin Radiographs is Clinically Reliable", Clin. Orthop. Relat. Res., vol. 471, 2013, pp. 1271-1276.
Inaba, Yutaka et al., "Preoperative Planing for Implant Placement with Consideration of Pelvic Tilt in Total Hip Arthroplasty: Postoperative Efficacy Evaluation", BMC Muscoskeletal Disorders, vol. 17, 2016, 7 pages.
International Search Report for Application No. PCT/IB2020/059716 dated Jan. 15, 2021, 2 pages.
International Search Report for Application No. PCT/IB2020/059717 dated Jan. 15, 2021, 4 pages.
International Search Report for Application No. PCT/IB2020/059718 dated Jan. 21, 2021, 2 pages.
International Search Report for Application No. PCT/IB2020/059720 dated Mar. 16, 2021, 5 pages.
International Search Report for Application No. PCT/US2010/000430 dated Jul. 30, 2010, 2 pages.
International Search Report for Application No. PCT/US2011/034649 dated Jul. 29, 2011, 1 page.
International Search Report for Application No. PCT/US2011/040213 dated Oct. 21, 2011, 2 pages.
International Search Report for Application No. PCT/US2012/062820 dated Mar. 19, 2013, 2 pages.
International Search Report for Application No. PCT/US2013/067563 dated Feb. 6, 2014, 2 pages.
International Search Report for Application No. PCT/US2014/016587 dated Sep. 10, 2014, 2 pages.
International Search Report for Application No. PCT/US2015/010188 dated Apr. 29, 2015, 1 page.
International Search Report for Application No. PCT/US2015/028066 dated Sep. 30, 2015, 1 page.
International Search Report for Application No. PCT/US2015/049671 dated Jan. 12, 2016, 4 pages.
International Search Report for Application No. PCT/US2016/028297 dated Aug. 30, 2016, 2 pages.
International Search Report for Application No. PCT/US2017/027695 dated Jul. 14, 2017, 1 page.
International Search Report for Application No. PCT/US2017/028537 dated Jul. 18, 2017, 1 page.
International Search Report for Application No. PCT/US2017/059286 dated Mar. 6, 2018, 1 page.
Kok, Manon et al., "Using Inertial Sensors for Position and Orientation Estimation" Foundations and Trends in Signal Processing, vol. 11, No. 12, 90 pages.
Lazennec, J.Y. et al., "Lumbar-Pelvic-Femoral Balance on Sitting and Standing Lateral Radiographs", Orthopaedics & Tramatology: Surgery & research, vol. 99S, 2013, pp. S87-S103.
Lazennec, J.Y. et al., "Pelvis and Total Hip Arthroplasty Acetabular Component Orientations in Sitting and Standing Positions: Measurements Reproductivity with EOS Imaging Systems Versus Conventional Radiographies", Orthopaedics & Traumatology:Surgery & Research, vol. 97, 2011, pp. 373-380.
Levi, Kemal et al., "Mechanics of Wound Closure: Emerging Tape-Based Wound Closure Technology vs. Traditional Methods", Cureus, Oct. 12, 2016, pp. 1-5.
Lewinnek, George E. et al., "Dislocations After Total Hip-Replacement Arthroplasties", The Journal of Bone and Joint Surgery, 1978, 5 pages.
Luinge, H.J. et al., "Measuring Orientation of Human Body Segments Using Miniature Gyroscopes and Accelerometers", Med. Biol. Eng. Comput., vol. 43, 2005, pp. 273-282.
Machine-assisted English language abstract and machine-assisted English language translation for DE 10 2015 100 795 A1 extracted from espacenet.com database on Aug. 17, 2021, 18 pages.
Madgwick, S. et al., "Estimation of IMU and MARG Orientation Using a Gradient Descent Algorithm", IEE Inernational Conference on Rehabilitation Robotics, Rehab Week Zurich Science City, Switzerland, Jun. 29-Jul. 1, 2011, 7 pages.
Maratt, M.D., Joseph D. et al., "Pelvic Tilt in Patients Undergoing Total Hip Arthroplasty: When Does it Matter?", The Journal of Arthroplasty, vol. 30, 2015, pp. 387-391.
Medhab, "Webpage", https://medhab.com/, 2020, 2 pages.
Merriam-Webster, "Definition of Integral" accessed on Sep. 13, 2017, https://www.merriam-webter.com/dictionary/integral, 11 pages.
Merriam-Webster, "Definition of Lateral",. http://www.merriam-webster.com/dictionary/lateral, accessed May 5, 2016, .9 pages.
Mjosund, Hanne Leirbekk et al., "Clinically Acceptable Agreement Between the ViMove Wireless Motion Sensor System and the Vicon Motion Capture System When Measuring Lumbar Region inclination Motion in the Sagittal and Coronal Planes", BMCMuscoskeletal Disorders, vol. 18, 2017, 9 pages.
Moes, M.sc., C.C.M., "Measuring the Tilt of the Pelvis", Oct. 19, 1999, 20 pages.
MUVR, Joint Replacement Rehab Application, https://apps.apple.com/us/app/muvr-joint-replacement-rehab/id1088381086?form=MY01SV&OCID=MY01SV, 2021, 3 pages.
MUVR, "Precision Motion Capture Webpage", https://getmuvr.com/, 2021, 2 pages.
My Recovery, "Future Health Works Application," https://apps.apple.com/us/app/myrecovery/id1199952761, 2021, 3 pages.
Nowka, Danny et al., "On Motions That Allow for Identification of Hinge Joint Axes from Kinematic Constraints and 6D IMU Data", https://www.control.tu-berlin.de/wiki/images/b/b3/Nowka2019_ECC.pdf, 201, 7 pages.
Parcells, Bert, "Cup Placement", Mar. 1, 2017, 9 pages.
Parcells, Bert, "Native Knee Alignment", https://hipandkneebook.com/tja-publication-blog/2017/3/1/knee-basics-native-alignment, Feb. 27, 2017, 4 pages.
Pierrepont, J. et al., "Patient-Specific Component Alignment in Total Hip Arthroplasty", Reconstructive Review, vol. 6, No. 4, Dec. 2016, 11 pages.
Pierrepont, J. et al., "Variation in Functional Pelvic Tilt in Patients Undergoing Total Hip Arthroplasty", The British Editorial Society of Bone & Joint Surgery, 2017, 8 pages.
Plethy, "Webpage", https://www.plethy.com/, 2020, 5 pages.
Posteraro, Robert H., "A PACS Education Presentation", Scholar Archive, 2003, 256 pages.
Snijders, M.D., T.E. et al., "Trigonometric Algorithm Defining the True Three-Dimensional Acetabular Cup Orientation", JBJS Open Access, 2018, 9 pages.
Abstract of Hunter, J., "The Exponentially Weighted Moving Average", Journal of Quality Technology, American Society for Quality Control, vol. 18, No. 4, Oct. 1, 1986, pp. 203-210, 4 pages.
Abstract of Kobashi, Syoji et al., "Wearable Joint Kinematic Monitoring System Using Inertial and Magnetic Sensors", Mar. 2009, 6 pages.
Abstract of Tada, Masahiro et at., "Detection of Driver's Anomaly Behavior Using Wireless 3D-Accelerometers", Transactions of the Japanese Society for Artificial Intelligence, vol. 23, No. 3, Jan. 2008, pp. 105-116 , 5 pages.
Adchem, "Products Webpage", 2021, http://adchem.com/main/medicalproducts.aspx, 2 pages.
amazon.com, "BodyMedia Fit Wireless Link Body Monitoring Armband", 1996-2021, 14 pages.
Argentum International, LLC, "K984204—510(k) Premarket Notification Summary, Silverlon Direct Pressure Wound Closure Strip", May 19, 2007, 12 pages.
Aria, "Digital Care Management Platform", 2021, https://think-aria.com/, 5 pages.
Barraza-Madrigal, J.A. et al., "Instantaneous Position and Orientation of the Body Segments as an Arbitrary Object in 3D Space by Merging Gyroscope and Accelerometer Information", Articulo De Investigacion, vol. 35, No. 3, Dec. 2014, pp. 241-252.
Bauback, Safa et al., "In Vivo Efficacy Study Showing Comparative Advantage of Bacterial Infection Prevention with Zip-Type Skin Closure Device vs. Subcuticular Sutures", Cureus, Aug. 4, 2018, 3102, pp. 1-11.

(56) References Cited

OTHER PUBLICATIONS

Berliner, J.L. et al., "What Preoperative Factors Predict Postoperative Sitting Pelvic Position One Year Following Total Hip Arthroplasty?", The British Editorial Society of Bone & Joint Surgery, 2018, 8 pages.
Blondel, B. et al., "Pelvic Tilt Measurement Before and After Total Hip Arthroplasty", Orthopaedics & Traumatology: Surgery & Research, vol. 95, 2009, pp. 568-572.
Bosch, "BMI160, Small, Low Power Inertial Measurement Unit Data Sheet", https://www.bosch-sensortec.com/media/boschsensortec/downloads/datasheets- /bst-bmi160-ds000.pdf, Nov. 25, 2020, 114 pages.
Carollo, James et al., "Pelvic Tilt and Rotation in Hip Radiographs Can Be Estimated Using Anatomical Landmarks to Avoid Incorrect Clintical Measurements", ORCS, 2014, 5 pages.
Chen, Eduard et al., "Implant Position Calculation for Acetabular Cup Placement Considering Pelvic Lateral Tilt and Inclination", Informa UK Ltd,, 2006, 9 pages.
Claris Reflex, "Webpage", https://clarisreflex.com/, 11 pages.
Conzian, "Knees Up Care Webpage", https://www.conzian.com/en/kneesup/, 2020, 10 pages.
Corin, "Remote Patient Monitoring Platform Webpage", https://www.coringroup.com/healthcare-professionals/solutions/corin-rpm/, 2021, 8 pages.
Davis, Ann et al., "Effect of Surgical Incision Closure Device on Skin Perfusion Following Total Ankle Arthroplasty", UF Health, 2017, Postet, 1 page.
dictionary.com, "Definition of "Fixed"", Available at http://www.dictionary.com/browse/fixed, accessed on Sep. 13, 2017.
Dorsavi USA, Inc., "ViMove 5.11 User Manual", 2015, 31 pages.
Dorsavi, "ViMove 2 User Manual Version 2.1.5", 2018, 45 pages.
Dorsavi, "Wearable Sensor Technology Webpage", https://www.dorsavi.com/us/en/, 2021, 5 pages.
Eggli, S. et al., "The Value of Preoperative Planning to Total Hip Arthroplasty", University of Bern, Switzerland, The Jouranl of Bone & Joint Surgery, 1997, 9 pages.
English language abstract and machine-assisted English translation for CN 104825200 A extracted from espacenet.com database on May 4, 2022, 38 pages.
English language abstract and machine-assisted English translation for CN 109163721 A extracted from espacenet.com database on Apr. 18, 2022, 31 pages.
English language abstract and machine-assisted English translation for CN 1442119 A extracted from espacenet.com database on May 4, 2022, 7 pages.
English language abstract and machine-assisted English translation for CN 1524507 A extracted from espacenet.com database on May 4, 2022, 7 pages.
English language abstract and machine-assisted English translation for CN 202537562 U extracted from espacenet.com database on May 4, 2022, 5 pages.
English language abstract and machine-assisted English translation for JP 2018-057527 A extracted from espacenet.com database on Apr. 18, 2022, 12 pages.
English language abstract and machine-assisted English translation for WO 2019/112158 A1 extracted from espacenet.com database on Apr. 20, 2022, 17 pages.
English language abstract for CN 101938944 A extracted from espacenet.com database on May 4, 2022, 2 pages.
English language abstract for CN 102946812 A extracted from espacenet.com database on May 4, 2022, 1 page.
English language abstract for CN 104755033 A extracted from espacenet.com database on May 4, 2022, 2 pages.
English language abstract for CN 1126430 A extracted from espacenet.com database on May 4, 2022, 2 pages.
English language abstract for EP 3 139 835 B1 extracted from espacenet.com database on Aug. 17, 2021, 2 pages.
English language abstract for JP 2001-149485 A extracted from espacenet.com database on May 4, 2022, 2 pages.
English language abstract for JP 2005-512678 A extracted from espacenet.com database on May 4, 2022, 2 pages.
English language abstract for JP 2005-532134 A extracted from espacenet.com database on May 4, 2022, 1 page.
English language abstract for JP 2010-504835 A extracted from espacenet.com database on May 4, 2022, 1 page.
English language abstract for JP 2013-515417 A extracted from espacenet.com database on May 4, 2022, 2 pages.
English language abstract for JP 2013-538603 A extracted from espacenet.com database on May 4, 2022, 2 pages.
English language abstract for JPH 07-502913 A extracted from espacenet.com database on May 4, 2022, 2 pages.
English language abstract for JPS 62-243557 A extracted from espacenet.com database on May 4, 2022, 1 page.
English language abstract for WO 2007/004603 A1 extracted from espacenet.com database on May 4, 2022, 1 page.
English language abstract for WO 2008/044679 A1 extracted from espacenet.com database on May 9, 2022, 2 pages.
English language abstract for WO 2018/092944 A1 extracted from espacenet.com database on Apr. 20, 2022, 2 pages.
English language abstract for WO 2020/004660 A1 extracted from espacenet.com database on Aug. 17, 2021, 2 pages.
English language abstract only (original document unavailable) for AU 201616964 S extracted from espacenet.com database on May 4, 2022, 1 page.
English language abstract only (original document unavailable) for AU 201616965 S extracted from espacenet.com database on May 4, 2022, 1 page.
English language abstract only (original document unavailable) for AU 201616966 S extracted from espacenet.com database on May 4, 2022, 1 page.
Sprigle, Ph.D, Stephen et al., "Development of a Noninvasive Measure of Pelvic and Hip Angles in Seated Posture", Arch Phys Med Rehabil, vol. 83, 6 pages.
Strive Medtech, "Better Care; Better Outcomes Application," https://apps.apple.com/us/app/strive-orthopedics/id1436221287?form=MY01SV&OCID=MY01SV, 2021, 3 pages.
Strive Medtech, "Webpage", https://strivemedtech.com/, 2021, 4 pages.
Stryker Mako Tha, "Application User Guide", Jun. 2019, 172 pages.
Stryker Mako Tha, "Surgical Guide", Jun. 2019, 82 pages.
Sword Health, "Webpage", https://swordhealth.com, 2021, 7 pages.
Tamura, Satoru et al., "Hip Range of Motion During Dailty Activities in Patients with Posterior Pelvic Tilt from Supine to Standing Position", Wiley, Feb. 2015, 6 pages.
Tannast, M. et al., "Estimation of Pelvic Tilt on Anteposterior X-Rays—A Comparision of Six Parameters", Skeletal Radiol., vol. 35, 2006, pp. 149-155.
Tetsunaga. Tomonori et al., "An Accelerometer-Based Navigation System Provides Acetabular Cup Orientation Accuracy Comparable to That of Computed Tomography-Based Navigation During Total Hip Arthroplasty in the Supine Position", Journal ofOrthopaedic Surgery and Research, vol. 15, 2020, 7 pages.
Thakral, Gaurav et al., "Electrical Simulation to Accelerate Wound Healing", CoAction, 2013, vol. 4,, No. 22081, pp. 1-9.
Tracpatch, "Webpage", https://tracpatch.com/blog/the-tracpatch-wearable-device/, 2019, 3 pages.
Trippe, Anthony, "Jawbone vs. Fitbit—A Patent Landscape Report", 2021, 16 pages.
Tyler, Timothy et al., "A New Pelvic Tilt detection Device" Roentgenographic Validation and Application to Assessment of Hip Motion in Professional Ice Hockey Players, Journal of Orthopaedic & Sports Physical Therapy, 1996, 7 pages.
Wang, R.Y. et al., "Measurement of Acetabular Inclination and Anteversion via CT Generated 3D Pelvic Model", BMC Muscoskeletal Disorders, vol. 18, 2017, 7 pages.
Wyles, Cody, C. et al., "Running Subcuticular Closure Enables the Most tobust Perfusion After TKA: A Randomanized Clinical Trial", Clinical Orthopaedics and Related Research, Springer, Mar. 3, 2015, pp. 1-10.
Xsens, "3D Motion Tracking Webpage", https://www.xsens.com/, 2021, 6 pages.

(56) References Cited

OTHER PUBLICATIONS

Yang, M.D., Gyoyue et al., "The Influeence of Pelvic Tilt on the Anteversion Angle of the Acetabular Prosthesis", 2019, 8 pages.

Yi, Chunzhi et al., "Estimating Three-Dimensional body Orientation Based on an Improved Complementary Filter for Human Motion Tracking", MDPI, 2018, 19 pages.

Zhang, Yuxin et al., "Electronic Skin Wearable Sensors for Detecting Lumbar-Pelvic Movements", MDPI, Mar. 2020, 28 pages.

Zimmer Biomet, "My Mobility with Apple Watch Webpage", https://www.zimmerbiomet.com/medical-professionals/zb-edge/mymobility.html, 2021, 7 pages.

Zipline Medical, Inc., "Zip Surgical Skin Closure Webpage", accessed Aug. 17, 2016, http://www.ziplinemedical.com/products/zip-surgical-skin-closure/, 2 pages.

\* cited by examiner

TIME SYNCHRONISATION

CROSS-REFERENCE TO RELATED APPLICATION(S)

This patent application is a 371 National Phase of and claims the benefit of priority to International Application No. PCT/GB2019/052088, filed on Jul. 25, 2019, which claims the benefit to GB Application 1812305.9, filed Jul. 27, 2018, the entireties of which are incorporated herein by reference.

This invention relates to determining the timing status of a communication device and synchronising clocks in dependence on that status.

Communication devices perform events at different times. Those events may include transmitting, receiving and sensing or processing data locally. A communication device may include a clock. Events performed by the device may be designated to a time by reference to the clock. In many situations it is advantageous to determine aspects of the timing of operations performed by a communication device. One reason for doing so might be to help determine the relative timings of events that are sensed by independent sensing devices. For example, FIG. 1 shows two units 1, 2. Each unit has a communication device 3, 4. The communication devices can communicate wirelessly with each other, as illustrated at 5. The communication devices each include a respective clock. Each unit also has a sensor 6, 7. When the sensors sense events it may be useful to understand the relative timings of those events. This requires the local reference clocks of the units to be synchronised, so that the offset between them is known. A synchronisation process could be implemented in which one of the clocks is reset to match the other, so that the offset between the two clocks is zero. Alternatively, the offset (which might not be zero) can be determined and used to interrelate times indicated by the respective clocks. One way to synchronise the units is for them both to communicate with a separate reference time source. Another approach is to use the communication link 5 to help establish a common timebase between the units.

Some communication devices can provide a dedicated timing output. This timing output may be provided on a dedicated physical interface, or it may be implemented using a message sent over a multipurpose data interface. For example, a cellular modem circuit may be able to provide an output indicating the time as provided to it by a network in which it is communicating. Other communication devices may provide outputs indicating time with reference to some other clock. For example, a Bluetooth communication device may provide an output which reports time with respect to the Bluetooth master clock for a piconet in which it is participating.

Some communication devices do not provide a dedicated clock output mechanism. This may be because they do not maintain a reference clock, or it may be because their hardware is designed in such a way that it does not allow the state of their reference clock to be exposed externally.

There is a need for an improved way to derive a timing reference from a communication device.

According to one aspect there is provided a device comprising: a wireless communication interface, the communication interface being capable of using an external signal processing device to support a transmission or reception communication event and being configured to provide a first output signal from the communication interface for disabling such a signal processing device after the communication event; a clock external to the communication interface; and a synchronisation circuit configured to receive the first output signal and to synchronise the clock in dependence on the timing of the first output signal.

The wireless communication interface may be configured to use an external amplifier for amplifying signals to be transmitted by the interface. The wireless communication interface may be configured to provide the first output signal when transmission of a signal is complete.

The wireless communication interface may be configured to use an external amplifier for amplifying signals received by the interface. The wireless communication interface may be configured to provide the first output signal when reception of a signal is complete.

The wireless communication interface may be configured to provide a second output signal for indicating that the communication event is logically complete.

The second output signal may be provided as an interrupt.

The synchronisation circuit may be configured to synchronise the clock in dependence on the timing of the first output signal only if it detects the second output signal within a predetermined time after the first output signal.

The wireless communication interface may operate according to a protocol that provides for a synchronisation signal to be transmitted at a predetermined time by one participant in a network and received by all other participants in the network, and wherein the communication event is the transmission or reception of such a signal.

The synchronisation circuit may be configured to determine whether the first output signal relates to an event that is the transmission or reception of a synchronisation signal and to synchronise the clock in dependence on the timing of the first output signal only if that determination is positive in respect of the first output signal.

The synchronisation circuit may be configured to synchronise the clock by adjusting the phase of the clock in dependence on the timing of the first output signal.

The device may comprise a counter configured to count at a frequency dependent on the output of the clock and the synchronisation circuit is configured to synchronise the clock by adjusting the counter in dependence on the timing of the first output signal.

The device may comprise a counter configured to count at a frequency dependent on the output of the clock and the synchronisation circuit is configured synchronise the clock by storing the value of counter at the time of the first output signal.

The device may comprise a sensor for sensing an environmental characteristic and generating sensed data indicative of the sensed characteristic, and the device being configured to represent the time of the sensed data with reference to the synchronised clock.

According to another aspect there is provided a method for synchronising two devices, each device having a communication circuit implemented as an integrated circuit, a first one of the communication circuits having (i) a first signal output for presenting a signal for transmission to an external amplifier, (ii) a first signal input for receiving a signal for transmission from an external amplifier, that one of the communication circuits being configured to cause a signal received at the signal input to be transmitted, and (iii) a first control output for signalling when an external amplifier coupled between the first signal output and the first signal input is to be active, and a second one of the communication circuits having (i) a second signal output for presenting a received signal to an external amplifier, (ii) a second signal input for receiving an amplified signal from an external amplifier, that one of the communication circuits being configured to perform signal decoding on a signal received at the signal input, and (iii) a second control output for signalling when an external amplifier coupled between the signal output and the signal input is to be active; the method comprising determining the relative timings of events sensed by the devices in dependence on the timings of signals at the first and second control outputs. The first and second control outputs may be outputs from the respective integrated circuits.

Each device may comprise a clock external to the communication circuit. The method may comprise synchronising the clocks in dependence on the timings of signals at the first and second control outputs.

The method may comprise timing a first event at a first one of the devices with reference to its clock and timing a second event at a second one of the devices by reference to its clock.

The present invention will now be described by way of example with reference to the accompanying drawings.

Figure 1:
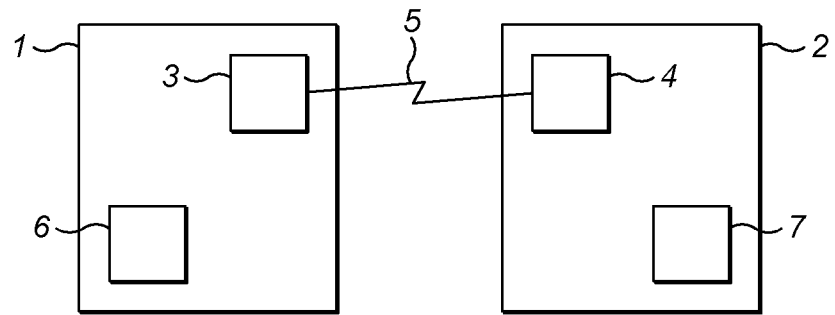
FIG. 1 is a schematic diagram of a generalised system comprising two units.
Figure 2:
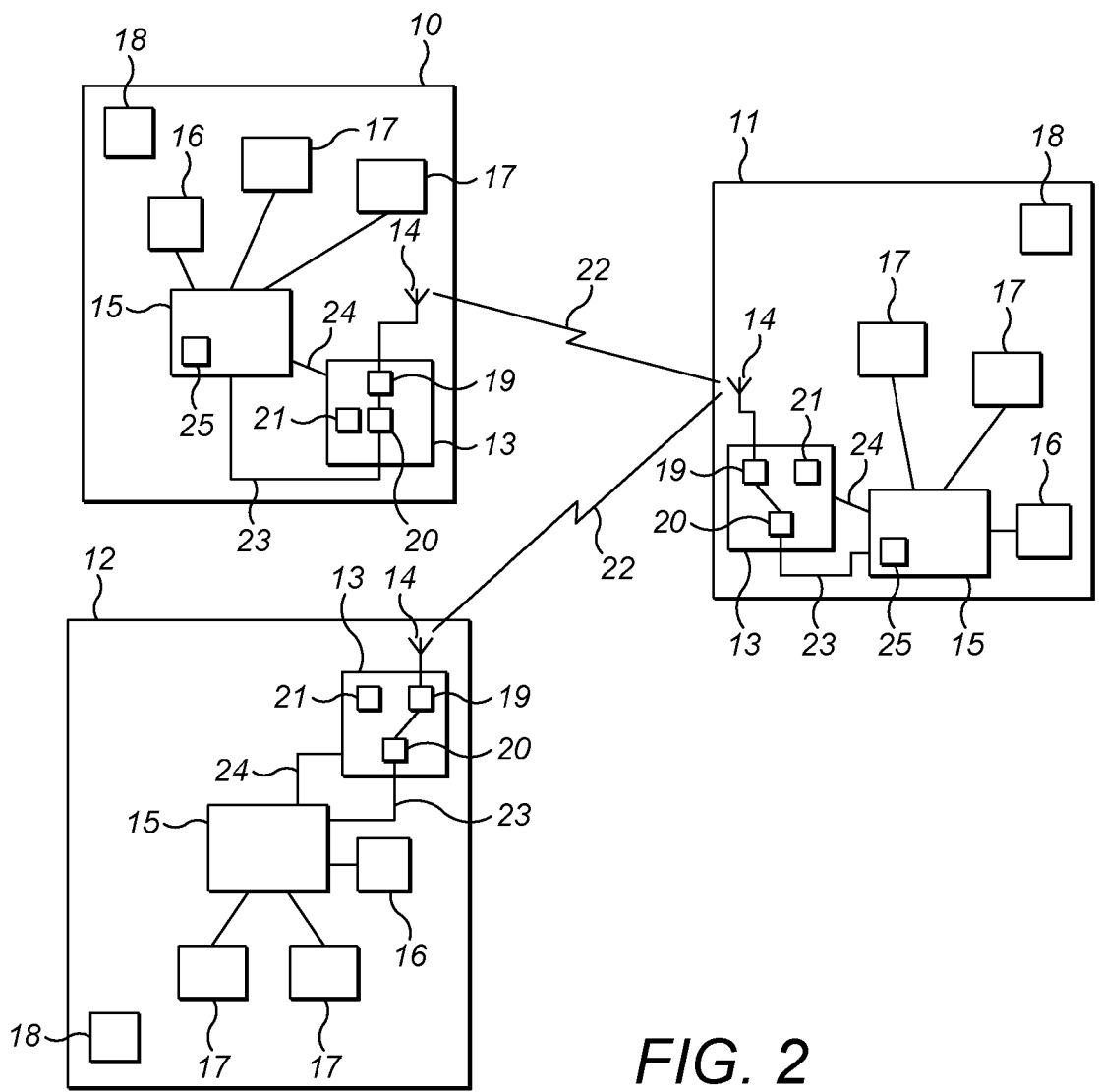
FIG. 2 shows the architecture of a sensor system.

FIG. 2 shows a system having multiple intercommunicating sensing units. The units are designated 10, 11, 12. Each unit may be a discrete element having its own outer housing. Each unit may be separate from and moveable independently with respect to the other units. For example, each unit may be an individual portable sensing unit.

Analogous components of each sensing unit are designated with the same reference numbers. Each unit has a wireless communication interface 13 coupled to an antenna 14, a processor 15, a memory 16, sensors 17 and a battery 18. In each unit, the communication interface 13 implements a wireless communication protocol for transmitting and receiving data via the antenna 14. The communication interface includes a radio frequency (RF) front-end 19, a digital signal processor (DSP) 20 and a clock 21. The memory 16 stores in a non-transient way program code executable by the processor 15 to cause it to perform its functions. The sensors 17 are configured to sense environmental data and pass the results of such sensing to the processor. The battery powers 18 the operations of the unit.

The communication interfaces 13 of the units are capable of communicating wirelessly with each other as indicated at 22. The topology of the network formed by the communication interfaces can take any suitable form. For example, each communication interface may communicate with all the others, e.g. in a mesh; or each communication interface may communicate with only a single one of the others, that single unit acting as a master for controlling aspects of the operation of the network; or a device may act as a master and a slave simultaneously, e.g. in different networks or subparts of a network. The communication interfaces may use any suitable protocol. Examples include IEEE 802.11 and Bluetooth. The communication interfaces may communicate in the ISM band or in any other suitable frequency band.

The clock may comprise an oscillator which provides a regular stream of pulses to the DSP 20. The DSP may count those pulses to provide a measure of time for use by the respective communication interface.

When the units are operating, their sensors 17 sense environmental data. Examples of what this environmental data may represent will be given below. The results of the sensing can be passed to the respective unit's processor 15.

The processor may store the data in memory 16. The processor may signal the unit's communication interface 13 over a data link 23 between the processor and the communication interface to cause the communication interface to transmit the sensed data. That data can then be uploaded to another unit for further analysis or for display to a user. The sensed data may be extracted from the units by other interfaces, for example via a wired link.

When an event is sensed by one of the sensors it may be desirable to relate the time of that event to the times of other events sensed by others of the units. Ways in which that may be done will now be described.

Figure 3:
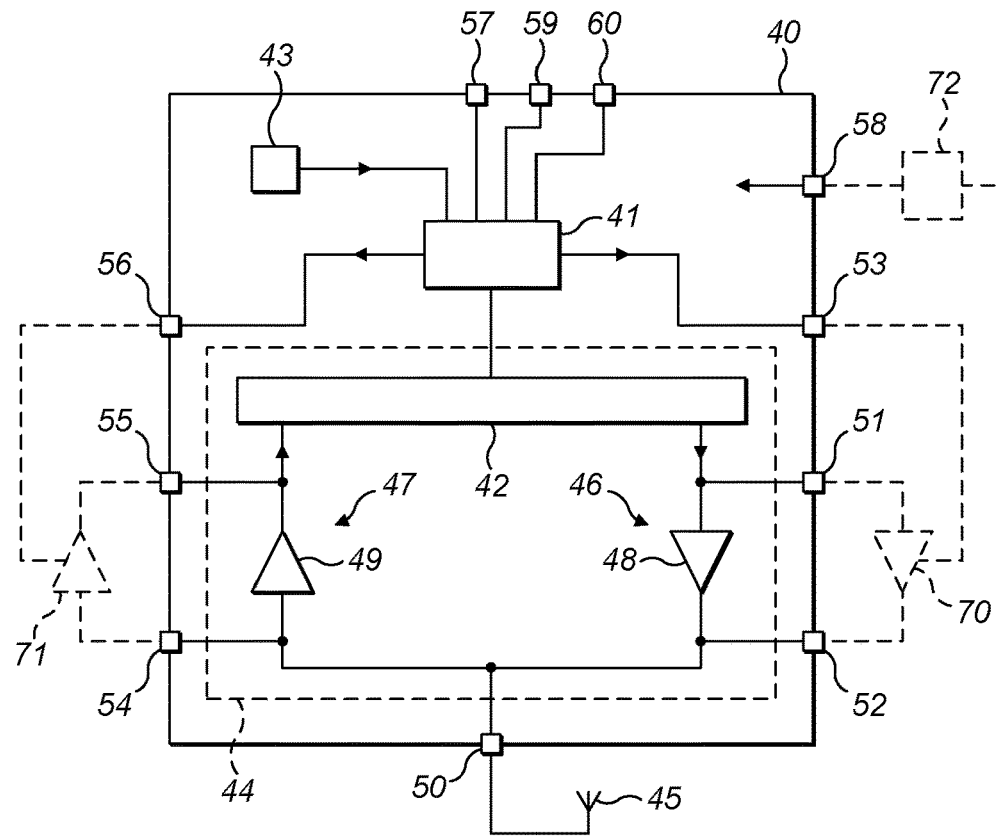
FIG. 3 shows a wireless communication interface.

FIG. 3 shows an example architecture for a communication interface 40, which may serve as an interface 13 in the architecture of FIG. 2. The interface 40 may conveniently be implemented on a single integrated circuit, but it may alternatively be implemented using multiple integrated circuits and/or discrete components. The interface includes a DSP 41, an RF front-end 44 and a clock 43. For clarity, the majority of the RF front-end is not shown in detail and is represented by block 42. Input and/or output nodes to and/or from the interface are shown at 50-60. When the communication interface 40 is implemented as a single integrated circuit, these may each be constituted by one or more connection pads. Connection pad 50 is provided for coupling the communication interface 40 to an external antenna 45. The communication interface may alternatively have an internal antenna. The communication interface 40 has a transmit path shown generally at 46 for carrying signals that are to be transmitted to the antenna port 50, and a receive path shown generally at 47 for carrying signals received at the antenna to the block 42 for processing.

In the transmit path 46, signals generated by the processing block 42 of the RF front-end are amplified by a power amplifier (PA) 48 for transmission. The architecture shown in FIG. 3 provides for two amplification mechanisms. First, the communication interface includes the power amplifier 48 arranged in the transmit path 46. Second, the communication interface includes connectors 51,52 arranged in the transmit path. An external amplifier shown at 70 can be connected across these connectors and used to amplify the signals for transmission. To avoid the need for that external amplifier to be powered for longer than necessary, a power amplifier control output 53 is provided. This is controlled by the DSP 41. The power amplifier control output signals when transmission is to take place. For example, it may be high when the external amplifier is to be powered, and low otherwise. In implementations that use an external amplifier, the signal at the power amplifier control output can be used to control a switch which turns power to the external power amplifier on or off. Put another way, external amplifier 70 can be activated in response to the power amplifier control signal.

In the receive path, signals received at the antenna 45 are amplified by a low noise amplifier (LNA) 49 for subsequent processing. The architecture shown in FIG. 3 provides for two amplification mechanisms. First, the communication interface includes the low noise amplifier 49 arranged in the transmit path 47. Second, the communication interface includes connectors 54, 55 arranged in the transmit path. An external amplifier shown at 71 can be connected across these connectors and used to amplify the received signals. To avoid the need for that external amplifier to be powered for longer than necessary, an LNA control output 56 is provided. This is controlled by the DSP 41. The LNA control output signals when transmission is to take place. External amplifier 71 can be activated in response to that signal.

The communication interface has a data connector 57. This allows data to be passed to the interface for transmission, and allows received data to be passed out of the interface, e.g. to processor 15 of FIG. 2. Connector 57 may comprise multiple physical pads which operate in parallel to transmit or receive data. Connector 57 may couple to data line 23 of FIG. 2.

The clock 43 is an oscillator. The clock generates a regular stream of output pulses. These are received by the DSP 41. The DSP 41 counts the pulses to form an indication of the current time from the perspective of the DSP. Some communication protocols may provide for time to be synchronised between participants in a communication network operating according to such a protocol. This may involve one or more devices transmitting their current time to one or more other devices in the network. An offset between the clocks may then be determined, and may be stored by one or both devices. Synchronisation may involve one or more devices adjusting their clocks to bring its clock transitions into closer alignment with the clock transitions of the clocks of one or more other devices in the network.

For example, a device A may have a current clock value of 2384 and a device B may have a current clock value of 2484. In one form of synchronisation each device may transmit its current clock value to the other. Each device may then store the offset from its own clock of the other device's clock. Device A may store +100 and device B may store −100. Then the devices can interrelate times in the clocks of either device. Alternatively, given the clock values stated above, device A may reset its clock to 2484, the value of B's clock. Then the offset is zero. Other forms of synchronisation are possible. For example the offset could be reset to a value other than zero, or both clocks could be reset simultaneously to a predetermined value, or an offset between the clocks could be stored at a third device. In each case, the outcome is that data is available whereby a time as indicated by one clock can be temporally related to a time as indicated by the other clock.

The communication interface 40 has a power input 58 for receiving electrical power to operate the interface. A power sensing circuit 72 may be located in the power supply to the power input for measuring power supplied to the interface.

The connections 51, 53, 54, 56 may be coupled to the processor 15 of the respective sensing unit by way of a probe connection 24. The probe connection may also carry a signal indicating the state of the power sensing circuit 72. The probe connection may have a dedicated line for each of the connections 51, 53, 54, 56 so that it the processor can sense in real time the state of each of those outputs from the communication interface.

The communication interface supports a protocol according to which signals are transmitted in packets. The packets are transmitted according to a transmission schedule. The schedule is defined at least in part by the protocol, and may additionally be dependent on parameters defined by one or more of the participants and transmitted to one or more other participants. For example, the protocol may define a schedule according to which one of the participants may transmit to one of the other participants at a predefined time. This allows the participant that is intended to act as receiver to operate in a relatively low power state until the time when a communication might be directed to it, and then to enter a higher power state with its reception capabilities enabled for the period when a transmission is expected. One illustrative example of a protocol that works in this way is Bluetooth.

When the communication interface 40 is to make a transmission, the DSP 41 forms the digital data to be transmitted. If that is data purely for supporting the protocol then the data may be generated by the DSP. If the data is traffic data, for example an indication of a condition sensed by a sensor 17 then it may be received from the processor over link 23 and connector 57. The DSP then passes the data for transmission to the RF front-end 42. It also signals at port 53 that any external amplifier 70 can be turned on. A first state (e.g. low) of port 53 may indicate that the external amplifier is not to be enabled, and a second state (e.g. high) of port 53 may indicate that the external amplifier is to be enabled. Then analogue signals for transmission are formed by the block 42 and passed to amplifier 48. Those signals are also passed to port 51 so that they can be input to any external amplifier. The amplified signals then pass to the antenna 45 for transmission. When the amplifier 48 is operating, the power drawn by the communication interface 40 may increase. That may be sensed by power sensing circuit 72. When the communication interface has successfully made a data transmission, it may signal that externally, e.g. over connector 57 or using a dedicated "TX successful" line terminating at a connector pad 59. A data transmission may be deemed successful if the act of transmitting the signal is completed without error, or if an acknowledgement of the transmission is received. Pad 59 may be connected to the probe connection 24.

When the communication interface 40 is to make a reception, RF signals impinging on the antenna 45 pass to the LNA, which amplifies them and passes them to the RF front-end for processing. The output of the RF front-end passes to the DSP, which decides what data (if any) is contained in the signals. If the data relates purely to supporting the protocol then it may be used internally by the DSP. If the data is intended for another consumer, e.g. at user level, then the DSP transmits the data via connector 57. When the DSP is expecting to receive data it signals at port 56 that any external amplifier 71 can be turned on. A first state (e.g. low) of port 56 may indicate that the external amplifier is not to be enabled, and a second state (e.g. high) of port 56 may indicate that the external amplifier is to be enabled. When the amplifier 49 is operating, the power drawn by the communication interface 40 may increase. That may be sensed by power sensing circuit 72. When the communication interface has successfully made a data reception, it may signal that externally, e.g. over connector 57 or using a dedicated "RX ready" line terminating at a connector pad 60. A data reception may be deemed successful if the received data, taking a predetermined format, has reached an end; or if a predetermined period has elapsed since the last data was received. Pad 60 may be connected to the probe connection 24. The signals representing the logical results of transmission and/or reception operations, e.g. as provided to pins 59, 60, may be provided as interrupts.

Figure 4:
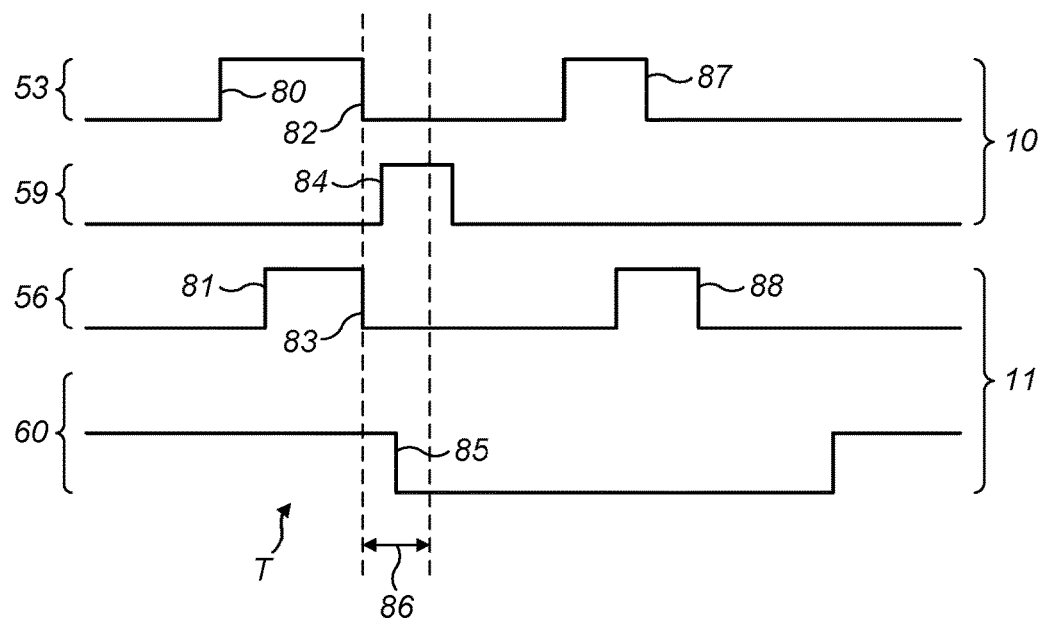
FIG. 4 shows signal timings.

FIG. 4 shows the state of the outputs 53, 59, 56 and 60 for two separate communication interfaces when a scheduled transmission is taking place. In this example, a transmission takes place from unit 10 to unit 11. The plots in FIG. 4 show, in order starting from the top of the figure, the states of:
 pad 53 of the communication interface of unit 10;
 pad 59 of the communication interface of unit 10;
 pad 56 of the communication interface of unit 11;
 pad 60 of the communication interface of unit 11.

A packet is expected to be transmitted at the time indicated in FIG. 4 as T. This time is known to the communication interfaces of units 10 and 11 because the clocks of their communication interfaces are synchronised and the time T is defined by the protocol they are using. In advance of time T, the communication interface of unit 10 prepares for transmission by enabling its external transmit amplifier (if any) as indicated by a change of state (80) of pad 53. In advance of time T, the communication interface of unit 11 prepares for reception by enabling its external receive amplifier (if any) as indicated by a change of state (81) of pad 56. Then the communication interface of unit 10 transmits a packet to the communication interface of unit 11. Once the packet has been transmitted the transmitting interface disables its external transmit amplifier (transition 82) and the receiving interface disables its external receive amplifier (transition 83). It is logical for these transitions to take place promptly after the end of transmission and reception since that minimises potential power draw from an external amplifier. When transmission has taken place, the transmitting interface signals that by means of a "TX successful" event. That may be a transition (84) on pad 59 or it may be provided as a message over line 24. When reception has taken place, the receiving interface signals that by means of an "RX ready" event. That may be a transition (85) on pad 60 or it may be provided as a message over line 24. The significance of these signals may vary. For example, the transmitting interface could generate a "transmit ready" signal or the receiving interface could generate an "RX complete" signal.

At the processors 15 of the respective sensing units, the pins 53, 59, 56 and 60 are monitored. If the signals indicated in FIG. 4 as being carried by pins 59 and 60 are passed over link 23 then they could be monitored in that way. It should be noted that it does not matter whether either unit has an external amplifier 71, 72: the signals to control such an amplifier can be monitored irrespective of whether such an amplifier is present.

At unit 10, when transition 82 (a transition indicating the end of a transmission) occurs the processor records the time of that with reference to its local clock 25. For example, it may store the state of the clock counter, or reset it to a predetermined value such as zero, at that point. It may adjust the phase of the local clock 25 so that a predetermined point in the clock's phase matches the timing of the relevant transition. That point may serve as a reference time for subsequent events. When events are subsequently sensed by the sensors 17, they may be timestamped by the processor 15 with the time of its clock. That is, each event may have a time associated with it, which is the time of the clock 25 when the event was sensed. That time may be stored by the processor together with data defining the event (e.g. the actual sensed data) in memory 16. The processor may cause the time and the data defining the event to be transmitted over an external interface from the unit 10. At unit 11, when transition 83 (a transition indicating the end of a reception) occurs the processor records the time of that with reference to its local clock 25. For example, it may store the state of the clock counter, or reset it to a predetermined value such as zero, at that point. It may adjust the phase of the local clock 25 so that a predetermined point in the clock's phase matches the timing of the relevant transition. That point may serve as a reference time for subsequent events. When events are subsequently sensed by the sensors 17, they may be timestamped by the processor 15 with the time of its clock. That is, each event may have a time associated with it, which is the time of the clock 25 when the event was sensed. That time may be stored by the processor together with data defining the event (e.g. the actual sensed data) in memory 16. The processor may cause the time and the data defining the event to be transmitted over an external interface from the unit 11. Because the transitions 82 and 83 are close together in time, the clocks 25 of the processors 15 of units 10 and 11 can be closely synchronised by this mechanism. This allows events timestamped with the clocks to be accurately interrelated in time, even though the clocks 43 of the communication interfaces of units 10 and 11 are not explicitly exposed externally. It has been found that using this mechanism events can in some circumstances be interrelated to less than 2 µs.

It is possible that the pins 53, 56 may transition as if to indicate the end of transmission or reception at times when transmission or reception has not occurred. Examples are shown in FIG. 4 at 87 and 88. To avoid these events upsetting the synchronisation of units 10 and 11, each processor 15 applies a time window 86 of a predefined duration after each transition indicating the end of transmission or reception. A transition is ignored for synchronisation purposes if the respective signal indicating successful transmission or reception (e.g. 84, 85) does not occur within that window. This method can reduce the chance that the synchronisation between units is mistakenly adjusted.

A further mechanism is to synchronise the devices based on the timing of the informational signals 84, 85 indicating that transmission and reception have ended. A disadvantage of this is that those signals can be offset in tie by a greater amount than the amplifier control signals indicating an end of amplifier demand as at 82 and 83.

Different mechanisms to trigger synchronisation may be employed at the transmitter and the receiver. For example, one may rely on one of the transitions 82, 83 and another may rely on one of the transitions 84, 85.

The processor 15 may use additional information to help decide when to synchronise its clock. In one example, the communication interface may indicate (e.g. over link 23) when a packet is being sent that is scheduled to be received by all participants in a network. That may be a synchronisation packet in a Bluetooth network. The system can usefully use such a packet for synchronisation because it can be expected that all participants in the network will either transmit or receive that packet. The processor may ignore signals indicating the end of transmission or reception, or successful transmission or reception, except those that relate to such packets. The communication interface may also signal whether it is to transmit or receive such a packet. This may enable the processor to selectively observe events relating to transmission or reception in response to such a signal.

The processor may detect that a received or transmitted signal is to be used or not used for synchronisation in dependence on the length of time for which an external amplifier is enabled during transmission or reception. That may indicate the type of signal being transmitted or received.

The processor may employ data relating to the power consumption of the communication interface to assist synchronisation. When one of the amplifiers 48, 49 is active the power consumption of the communication interface can be expected to be relatively high. When transmission or reception is complete the communication interface may deactivate that amplifier and power consumption may reduce. This may provide a signal from sensor 72 of similar shape to the first and third plots in FIG. 4, from which the processor can infer synchronisation in an analogous way to that described above.

Thus, in preferred aspects of the method described above, the processor of a unit comprising a wireless communication interface identifies a transition in an electrical signal external to the communication interface. That may, for example be a signal representing a demand for an external component to support the interface in transmission or reception, or a transition in power consumption by the interface. When the signal being sensed is binary, the transition may be recognised by virtue of it having a predetermined direction (e.g. low to high). When the signal being sensed is analogue, the transition may be recognised by virtue of it transitioning between two predetermined values. The transition may indicate the end of a transmission or reception event. The processor may be configured to synchronise the clock to such a signal only when the circumstances surrounding the signal meet other criteria, for example that one or more transitions of the same or other signals occur in a predetermined order and within a predetermined time of the primary signal. The processor may be configured so that it only resets the clock if those criteria are met.

It is convenient for the communication interfaces to operate according to a protocol in which communications are scheduled, but that is not essential. External amplifiers may be disabled after transmission for other reasons, and the end of transmission or reception may be signalled by informational signals in protocols of other types.

In the examples given above, the signals at pins 53, 56 are for enabling external amplifiers. They could each be for enabling any other external components that are for use during transmission or reception, for example a filter, a mixer or an oscillator. When such an external component is capable of being used for transmission, the communication interface may include a first output (51) for providing a radio frequency signal representing a signal to be transmitted and an second input (52) coupled to the antenna for receiving a signal formed by such an external device in dependence on the signal provided at the first output. When such an external component is capable of being used for reception, the communication interface may include a second output (54) coupled to the antenna for providing a radio frequency signal representing a received signal and a second input (55) coupled to processing circuitry of the communication interface (e.g. 42, 41) for receiving a signal formed by such an external device in dependence on the signal provided at the first output.

In the example given above, the operation of synchronising the local clock to the relevant timing signal is performed by a processor circuit executing software. The operation could alternatively be performed by dedicated hardware circuitry.

The units 10, 11, 12 may be configured for any suitable sensing activity. In one example, they may be capable of sensing the same characteristics at their respective locations. Examples of parameters that may be sensed by the sensors 17 include acceleration, orientation, temperature, pressure, light, sound, fluid flow, blood pressure and pulse rate. In one convenient example the units 10, 11, 12 are configured to be worn by a human or animal subject. They may be worn at different locations on the body to sense motion of the respective body part. By correlating the times of motion events by the mechanism described above, the motion of the subject's body parts can be inter-related.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device comprising:
   a wireless communication interface, the communication interface being capable of using an external signal processing device to support a transmission or reception communication event and being configured to provide a first output signal from the communication interface for disabling such a signal processing device after the communication event, wherein the wireless communication interface is configured to provide a second output signal for indicating that the communication event is logically complete;
   a clock external to the communication interface;
   a synchronisation circuit configured to receive the first output signal and to synchronise the clock in dependence on the timing of the first output signal; and
   wherein the synchronisation circuit is configured to synchronise the clock in dependence on the timing of the first output signal only if it detects the second output signal within a predetermined time after the first output signal.

2. A device as claimed in claim 1, wherein the wireless communication interface is configured to use an external amplifier for amplifying signals to be transmitted by the interface and is configured to provide the first output signal when transmission of a signal is complete.

3. A device as claimed in claim 1, wherein the wireless communication interface is configured to use an external amplifier for amplifying signals received by the interface and is configured to provide the first output signal when reception of a signal is complete.

4. A device as claimed in claim 1, wherein the second output signal is provided as an interrupt.

5. A device as claimed in claim 1, wherein the wireless communication interface operates according to a protocol that provides for a synchronisation signal to be transmitted at a predetermined time by one participant in a network and received by all other participants in the network, and wherein the communication event is the transmission or reception of such a signal.

6. A device as claimed in claim 5, wherein the synchronisation circuit is configured to determine whether the first output signal relates to an event that is the transmission or reception of a synchronisation signal and to synchronise the clock in dependence on the timing of the first output signal only if that determination is positive in respect of the first output signal.

7. A device as claimed in claim 1, wherein the synchronisation circuit is configured to synchronise the clock by adjusting the phase of the clock in dependence on the timing of the first output signal.

8. A device as claimed in claim 1, wherein the device comprises a counter configured to count at a frequency dependent on the output of the clock and the synchronisation circuit is configured to synchronise the clock by adjusting the counter in dependence on the timing of the first output signal.

9. A device as claimed in claim 1, wherein the device comprises a counter configured to count at a frequency dependent on the output of the clock and the synchronisation circuit is configured synchronise the clock by storing the value of counter at the time of the first output signal.

10. A device as claimed in claim 1, the device comprising a sensor for sensing an environmental characteristic and generating sensed data indicative of the sensed characteristic, and the device being configured to represent the time of the sensed data with reference to the synchronised clock.

* * * * *